March 13, 1951     J. L. HANCOCK     2,544,834
VALVE ADJUSTING TOOL
Filed June 30, 1947

Inventor

James Lewis Hancock

By *Clarence A. O'Brien*
and *Harvey B. Jackson*
Attorneys

Patented Mar. 13, 1951

2,544,834

UNITED STATES PATENT OFFICE 2,544,834

VALVE ADJUSTING TOOL

James Lewis Hancock, Indian Head, Md.

Application June 30, 1947, Serial No. 758,069

2 Claims. (Cl. 81—3)

1

This invention relates to new and useful improvements in tools, and more specifically, screw driver tools, and the principal object of the invention is to provide a device of the character herein described, such as may be conveniently and effectively employed for adjusting screws on moving portions of machinery, particularly overhead valve tappets on internal combustion engines, the invention embodying in its construction means for minimizing or altogether preventing the shock or vibration of the moving work from reaching the hand of the operator.

A further object of the invention is to provide an adjusting tool which, in addition to its primary purpose above outlined, may also be effectively employed on various moving machinery, other than engine valve tappets.

Another object of the invention is to provide an adjusting tool which is simple in construction, and which may be easily and conveniently manipulated.

An additional object of the invention is to provide an adjusting tool which will not easily become damaged and which will readily lend itself to economical manufacture.

With the above more important objects in view, and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
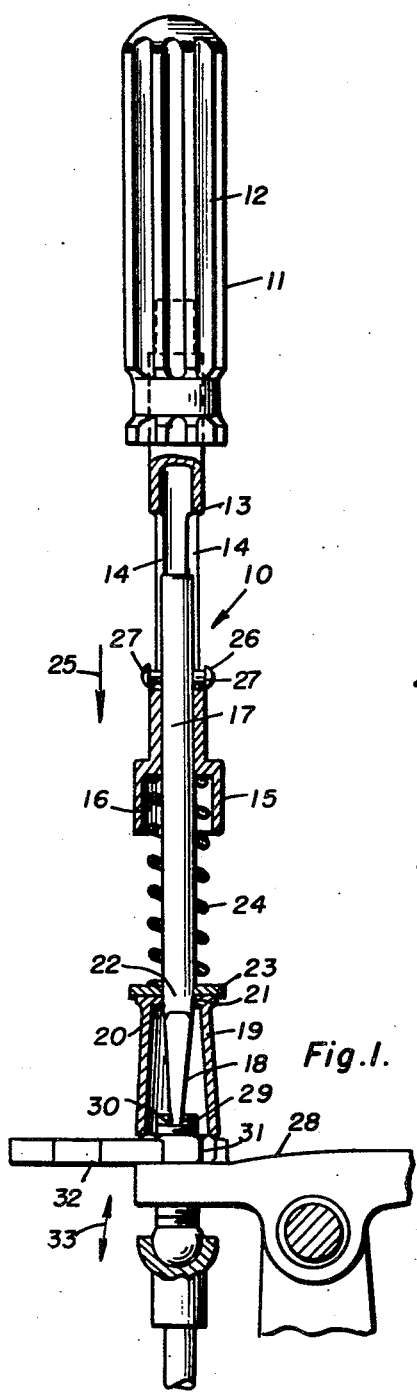
Figure 1 is an elevational view of the invention, partially broken away to reveal its construction and illustrating the same in use.
Figure 2:
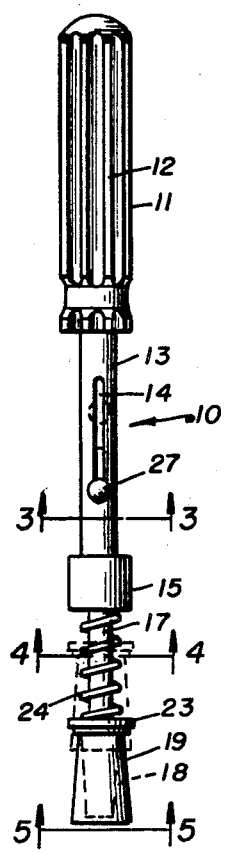
Figure 2 is a side elevational view of the invention per se.
Figure 3:
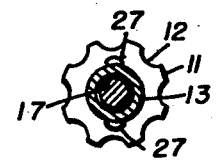
Figure 3 is a cross sectional view, taken substantially in the plane of the line 3—3 in Figure 2.
Figure 4:
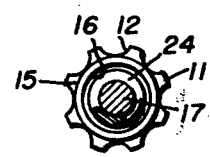
Figure 4 is a cross sectional view, taken substantially in the plane of the line 4—4 in Figure 2.
Figure 5:
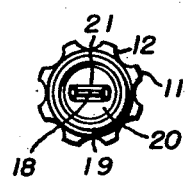
Figure 5 is a cross sectional view, taken substantially in the plane of the line 5—5 of Figure 2.

Referring now to the accompanying drawings in detail, the invention consists of an adjusting tool designated generally by the reference character 10, the same embodying in its construction an elongated handle 11, such as may be preferably formed with longitudinally extending flutes 12 of conventional design, as will be clearly apparent.

2

A tubular shank 13 is rigidly secured in one end portion of the handle 11, the shank 13 being formed in the lateral wall thereof with a pair of longitudinally extending, diametrically opposed slots 14, the purpose of which will be hereinafter more fully described.

It will be observed that the free end portion of the shank 13 terminates in an enlarged sleeve 15 which, in turn, is provided with a counterbore 16.

A stem 17 is slidably positioned in the bore of the shank 13 and projects at one end therefrom, the projecting end portion of the stem being flattened and providing what may be called a screwdriver blade 18.

A substantially cylindrical pressure cap 19 is slidably positioned on the stem 17 adjacent the blade 18, the cap 19 being formed with an end wall 20 which, in turn, is provided with an opening 21 so as to accommodate the stem 17. However, it should be noted that the opening 21 is of an elongated configuration and that it is not sufficiently large to accommodate either the circular cross section of the stem nor the relatively wide blade. Accordingly, the previously referred to sliding movement of the cap 19 is restricted to that on the stem portion 22 disposed between the circular cross section of the stem and the blade 18, as will be clearly apparent.

A flat washer 23 is positioned on the stem 17 adjacent the end wall 20 of the cap 19, and a compression spring 24 bears at one end adjacent this washer, while the remaining end of the spring is seated in the counter-bore 16 of the sleeve 15.

It will be observed that by virtue of this arrangement, the compression spring 24 will normally urge the stem 17 outwardly from the bore of the shank 13, as indicated by the arrow 25. However, means are provided for restricting the sliding movement of the stem, said means consisting of a rivet, or the like, 26, the end portions 27 of which project radially from the stem and slidably engage the aforementioned slots 14. In this manner, the inward and outward sliding movement of the stem 17 will be restricted to the extent of movement of the stops 27 in the slots.

When the invention is placed in use, it may be applied to a moving portion of machinery, such as for example, the valve tappet rocker arm 28 of an internal combustion engine. These arms are usually equipped with adjustable, screw-like members 29, these being formed with a kerf 30 which the blade 18 is adapted to engage.

Simultaneously, the lock nut 31 which is usually provided on the members 29 may be loosened or tightened in the conventional manner by means of a suitable wrench 32, before or after the adjustment of the member is made.

It will be found that as the rocker arm 28 moves rapidly in the directions of the arrows 33, the member 29 may be adjusted and the shock or vibration which would normally be transmitted to the hand of the worker if a conventional screw driver were employed, will be effectively absorbed by the resiliency of the spring 24 and by the sliding action of the stem 15 in the bore of the shank 13.

It will be also noted that when the blade 18 engages the kerf 30, the cap 19 will engage the nut 31 and in this manner, the cap will function as an effective guide while the adjustment of the member 29 is being effected. The small amount of sliding movement which the cap 19 is permitted on the stem 17 (against the resiliency of the spring 24) will assure proper contact of the cap with the lock nut 31 while the blade 18 engages the kerf 30, as will be clearly understood.

It is believed that the advantages and use of the invention will be clearly apparent from the foregoing disclosure and accordingly, further description thereof at this point is deemed unnecessary.

Having described the invention, what is claimed as new is:

1. A valve adjusting tool comprising in combination, a handle, a tubular shank secured to said handle and formed with a pair of longitudinally extending, diametrically opposed slots, a stem slidable in said shank and projecting at one end therefrom, a pair of radially projecting stops provided on said stem and slidably engaging said slots, the projecting end portion of said stem terminating in a screw driver blade, a pressure cap slidably positioned on said stem adjacent said blade, and a compression spring on said stem between said cap and said handle.

2. In a valve adjusting tool, the combination of a stem provided at one end thereof with a screwdriver blade, a handle slidably mounted on the remaining end portion of said stem, a pressure-exerting cap slidable on said stem over said blade, means provided on an intermediate portion of the stem and coacting with the handle for restricting the extent of sliding of said handle relative to said stem, and a spring positioned on an intermediate portion of the stem between said cap and said handle for urging the cap and the handle in relatively opposite directions.

JAMES LEWIS HANCOCK.

REFERENCES CITED

The following references are of record in the file of this patent:

UNITED STATES PATENTS

| Number | Name | Date |
|---|---|---|
| 887,644 | Jacobs | May 12, 1908 |
| 1,654,319 | Brown | Dec. 27, 1927 |
| 2,194,069 | Gagne | Mar. 19, 1940 |
| 2,430,119 | Frank | Nov. 4, 1947 |